United States Patent [19]

Romey, Sr.

[11] 4,386,556

[45] Jun. 7, 1983

[54] COFFEE MAKER WITH INSULATED DISPENSING CONTAINER

[76] Inventor: Edward J. Romey, Sr., 3216 SE. 157th, Portland, Oreg. 97236

[21] Appl. No.: 319,215

[22] Filed: Nov. 9, 1981

[51] Int. Cl.³ .................... A47J 31/46; A47J 31/50
[52] U.S. Cl. ................................ 99/290; 222/209; 222/383
[58] Field of Search ............... 99/290, 279, 298, 295, 99/300, 284, 292, 304, 316; 222/340, 341, 383, 209

[56] References Cited

U.S. PATENT DOCUMENTS

| | | | |
|---|---|---|---|
| 3,155,212 | 11/1964 | Hines | 99/290 |
| 3,905,520 | 9/1975 | Nishioka | 222/383 |
| 4,007,674 | 2/1977 | Lichowsky | 99/281 |
| 4,116,366 | 9/1978 | Takenakashima | 222/209 |
| 4,174,053 | 11/1979 | Shimizu | 222/383 |

*Primary Examiner*—Robert W. Jenkins

*Attorney, Agent, or Firm*—Chernoff, Vilhauer, McClung, Birdwell & Stenzel

[57] ABSTRACT

A coffee maker is comprised of a container having a pneumatically sealed, thermally insulated storage vessel arranged to receive brewed coffee from the brewing apparatus of the coffee maker through a reservoir located in the container and interconnected with the vessel by means of a passageway. Pressurized air can be introduced into the vessel by actuation of a pump mechanism located in the container to force coffee out of the vessel through a spout which extends from near the bottom of the vessel and projects outside of the container. A check valve located in the passageway prevents the pressurized air from the pump mechanism from escaping through the reservoir. The container is removable from the coffee brewer for remote serving and cleaning and the coffee maker is indexed to provide for locating the container relative to the coffee maker so that the reservoir is in the proper position to receive the brewed coffee from the coffee brewing apparatus.

5 Claims, 2 Drawing Figures

COFFEE MAKER WITH INSULATED DISPENSING CONTAINER

BACKGROUND OF THE INVENTION

This invention relates to an automatic coffee maker, and in particular to an automatic coffee maker which includes an insulated pressure dispensing container for the brewed coffee.

Coffee makers of the type which produce a predetermined amount of hot water and flow it through a porous filter containing ground coffee to produce brewed coffee are well known in the prior art. However, the prior art coffee makers have several shortcomings which make them less than ideal for home use where the brewed coffee will be consumed in small amounts over a relatively long time span and thus must be kept warm for extended periods.

Since this type of device uses gravity to cause the water to flow through the ground coffee and into the container, the container generally is open topped thereby preventing it from being effectively thermally insulated. Therefore, the coffee maker generally is provided with a hot plate on which the container sits in order to maintain the temperature of the brewed coffee. Due to the fact that the container is heated by a hot plate, it generally is not feasible to provide an insulated container and so the problem of maintaining the temperature of the brewed coffee is amplified.

Not only is heating in this manner inefficient from an energy point of view, a continuously operating hot plate is not desirable in a home setting. Firstly, it is a potential source of minor burns, particularly when young children are in the house, secondly it is a potential fire hazard in the event that combustible materials are inadvertently placed near it and third if a hot plate is left on after the container has been substantially emptied it can cause considerable damage to the container.

The subject invention overcomes the foregoing disadvantages and shortcomings of the prior art coffee makers by providing a container having a pnaumatically sealed and thermally insulated storage vessel located within it. The opening at the top of the vessel is sealed with a removable stopper at its upper end and the entire container is covered by a pivotally attached lid. Located within the lid is an air pump which is interconnected with an air supply tube which passes through the stopper into the vessel.

Located in the lid is a reservoir which is arranged to receive the brewed coffee from a conventional brewing apparatus and which also is interconnected with the supply tube. A check valve in the passageway prevents pressurized air from the air pump from escaping through the passageway out of the reservoir and thus ensures that it is passed into the vessel. The brewed coffee is dispensed from the container by a spout which extends upwardly from near the bottom of the vessel and exits from the container near its upper end.

Indexing means are provided in the brewing apparatus so that when the container is placed in the brewing apparatus it is properly aligned so that coffee passing through the filter is deposited into the reservoir in the lid of the container.

Thus even though the container is insulated and sealed, so that heat loss is greatly minimized, the brewed coffee is dispensed from the coffee brewing apparatus directly into the container without the need to manually remove a lid from the container or otherwise open it. Likewise, the coffee can be dispensed from the container merely by actuating the air pump without the necessity of opening the container or of undertaking any manual manipulations to it.

Accordingly, it is a principal object of the present invention to provide a coffee maker wherein the brewed coffee is automatically dispensed into a thermally insulated container which is pneumatically sealed to allow dispensing of the brewed coffee by means of an air pump.

It is a further object of the present invention to provide such a coffee maker wherein it is not necessary to prepare the container prior to or subsequent to its being filled with brewed coffee.

It is a further object of the present invention to provide such a device wherein the container can be removed from the remainder of the coffee brewer for remote serving and cleaning.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
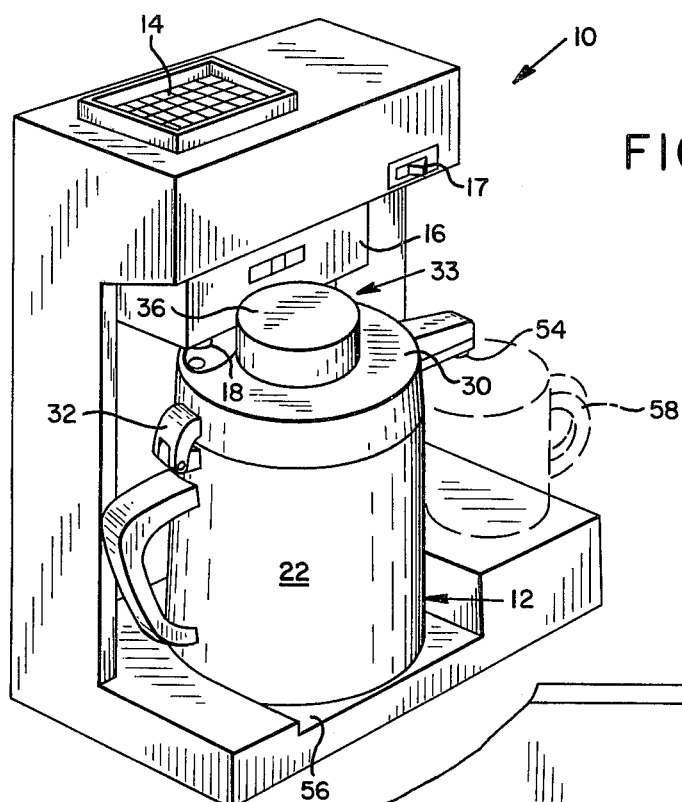
FIG. 1 is a perspective view of a coffee maker embodying the features of the present invention.
Figure 2:
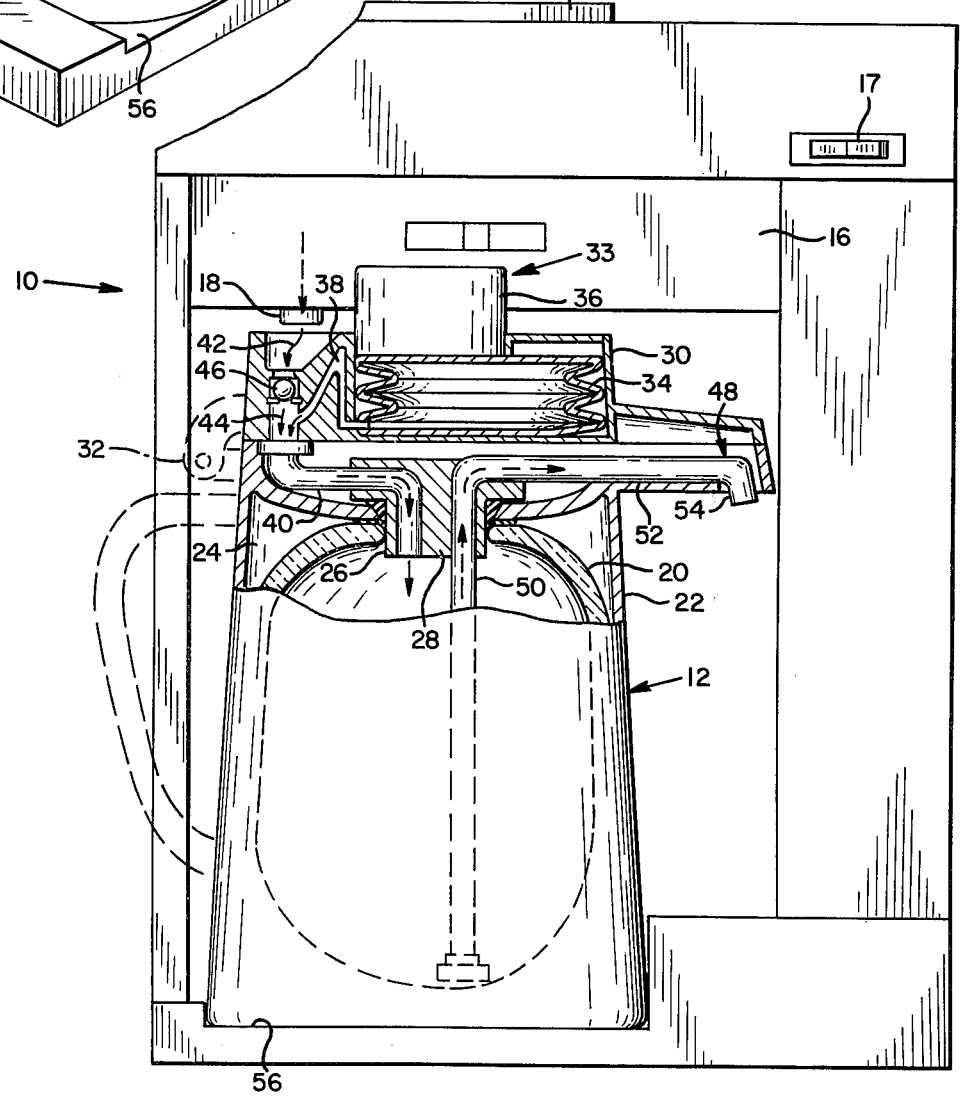
FIG. 2 is a side elevational view, partially broken away to show hidden detail, of the coffee maker of FIG. 1.

Referring to FIG. 1 of the drawings, the present invention provides a brewing apparatus 10, for brewing coffee, which is arranged to cooperatively accept a container 12 for receiving the coffee. In the embodiment of the invention illustrated, the brewing apparatus has an inlet 14 into which a measured amount of cold water is poured. However, the invention would operate equally well with a brewing apparatus which is connected to a water line through a timed valve which allows the required amount of water to enter the apparatus automatically.

In either case, once the storage tank (not shown) of the brewing apparatus is filled with water, the water is heated by a heating element (not shown) until localized boiling occurs thereby forcing the water upwardly through a tube (not shown) into a filter carrier 16. In the system illustrated, where water is poured into the brewing apparatus, heating is initiated by actuation of a switch 17.

Located in the filter carrier is a porous filter (not shown) which contains ground coffee. Thus as the hot water which is provided to the filter carrier is passed through the ground coffee in the filter, brewed coffee is provided. The filter carrier contains a spigot 18 at its lower end through which the brewed coffee flows into the container. This much of the coffee maker of the present invention is well known in the prior art.

Unlike the containers of the prior art coffee makers, the container 12 of the present invention has a pneumatically sealed storage vessel 20 which is thermally insulated, in this instance by placing it within an outer shell 22 and separating it from the shell by a sealed air chamber 24. While other materials would suffice, preferably the shell and vessel are of a plastic material both due to its high strength and low conductivity.

The opening 26 at the top of the vessel, which is necessary for cleaning the vessel, is sealed by means of a stopper 28. The stopper in turn is covered by means of a lid 30 which is pivotally attached to the shell 22 by means of a hinge 32. For aesthetic reasons the lid 30 is designed so that it appears to be an extension of the shell when it is in its closed position.

Located in the lid 30 is air pump means 33, such as the diaphragm 34 and plunger 36 illustrated. The diaphragm opens into a channel 38 which interfaces with a supply tube 30 which passes through the stopper 28 in the vessel 20. Also located in the lid is a reservoir 42 which is arranged to receive the brewed coffee as it is dispensed from the spigot 18 in the brewing apparatus 10. A passageway 44, into which the channel 38 opens, interconnects the reservoir 42 and the supply tube 40. Thus the brewed coffee flows from the reservoir 42 through the passageway 44 and the supply tube 40 into the vessel 20.

Located in the passageway 44, preferably immediately below the reservoir 42, is valve means, such as check valve 46. Thus while the brewed coffee is free to enter the passageway, pressurized air from the pump means 33 cannot escape through the reservoir but is forced into the vessel through the supply tube 40. The check valve 36 also prevents brewed coffee from leaving the container 12 through the reservoir 42 in the event that the container is tipped over. For the same reason, the channel 38 is U-shaped with the bend extending to near the top of the lid 30 to prevent brewed coffee from flowing into the diaphragm 34.

In order to permit the lid to be opened and closed relative to the container 12 and still provide an air tight seal between the air supply tube 40 and the passageway 44, a compressible gasket, not shown, is provided at their intersection.

The brewed coffee is dispensed from the container by spout means 48. In the embodiment illustrated the spout means comprises a vertical stand tube 50 which passes into the vessel through the stopper 28 and opens into the container near its bottom. The stand tube is interconnected at its upper end to a horizontal dispensing tube 52 which extends out of the container 12 and has a downwardly bent portion 54 at its outer extremity.

In the preferred embodiment of the invention, the container 12 is removable from the brewing apparatus 10 in order to facilitate remote serving and cleaning. Accordingly, indexing means, such as notch 56, is provided for locating the container 12 relative to the brewing apparatus in a manner such that the spigot 18 is aligned with the reservoir 42. Also the container is located so that the plunger 36 is in a position where it can be manipulated.

In operation, a desired amount of water is poured into the brewing apparatus through the inlet 14 and a filter filled with the correct quantity of ground coffee is placed in the filter carrier 16. Brewing is then initiated by actuating switch 17. The brewed coffee, which is dispensed from the spigot 18 of the brewing apparatus 10, flows into the reservoir 42 of the container, passes through passageways 44 and flow tube 40 into the vessel 20. Once in the vessel the brewed coffee remains warm for a long period of time due to the fact that the vessel is separated from atmospheric air by the shell 22 and the air chamber 24.

Thus the brewed coffee flows directly into the insulated dispensing container without the necessity of opening the lid on the container or placing the coffee first into an open topped uninsulated non-dispensing container and thereafter transferring it into the desired container.

Brewed coffee can then be dispensed from the container by depressing the plunger 36 on the air pump 33 thereby causing the diaphragm 34 to be compressed to force pressurized air through the channel 38 and supply tube 40 into the vessel above the brewed coffee. The pressurized air then causes a portion of the brewed coffee to be forced up the stand tube 50 and out the dispensing tube 52 where it can be collected in a cup 58.

As was noted above the container can be readily removed from the brewing apparatus for remote serving and cleaning.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. In a coffee maker of the type which, upon request, generates a metered amount of heated water, passes such heated water through ground coffee contained within a porous filter and collects the resulting brewed coffee in a suitable container for later use, the improvement comprising:
    (a) said container having a pneumatically sealed, thermally insulated storage vessel located within;
    (b) air pump means associated with said container for introducing pressurized air into said vessel;
    (c) spout means associated with said container including a stand tube which opens into said vessel proximate the bottom thereof, for dispensing coffee out of said container when said air pump means is actuated to introduce pressurized air into said vessel;
    (d) a reservoir located in said container for receiving the brewed coffee as it flows from the filter;
    (e) a passageway extending between said reservoir and said vessel; and
    (f) valve means located in said passageway for preventing the escape of air through said reservoir upon actuation of said air pump means.

2. The coffee maker of claim 1 wherein said container is removable from the remainder of said coffee maker.

3. The coffee maker of claim 2 including indexing means for indexing said container relative to the remainder of said coffee maker such that coffee which flows from said filter is collected in said reservoir.

4. The coffee maker of claim 1 wherein said container includes a removable top arranged to allow access into said vessel for cleaning.

5. The coffee maker of claim 1 including means for preventing coffee contained within said vessel from flowing into said pump means.

* * * * *